United States Patent [19]

Parmely et al.

[11] Patent Number: 4,876,674

[45] Date of Patent: Oct. 24, 1989

[54] SONIC COLLAR SHEEP PROTECTOR

[76] Inventors: Kevin W. Parmely, HRC 89, Box 193, Hamill, S. Dak. 57534; Scot R. Van Asten, 1021A Wisconsin St., Oshkosh, Wis. 54901; Harbor E. Stanton, P.O. Box 232, Ferryville, Wis. 54628

[21] Appl. No.: 232,226

[22] Filed: Aug. 15, 1988

[51] Int. Cl.$^4$ .............................................. H04B 1/02
[52] U.S. Cl. ................................. 367/139; 116/22 A; 119/106; 340/573
[58] Field of Search ...................... 116/22 A; 367/139; 119/106; 340/573, 384 E

[56] References Cited

U.S. PATENT DOCUMENTS

| | | | |
|---|---|---|---|
| 3,842,806 | 10/1974 | McBride | 119/106 |
| 4,227,189 | 10/1980 | Davis | 340/573 |
| 4,338,886 | 7/1982 | McBride | 119/106 |
| 4,669,424 | 6/1987 | Bianco et al. | 367/139 |

Primary Examiner—Thomas H. Tarcza
Assistant Examiner—Ian J. Lobo
Attorney, Agent, or Firm—Jerome J. Norris

[57] ABSTRACT

Predator control sonic collar unit for protecting livestock when placed around the neck, comprising means for detecting startled motion, means for transforming the startled motion into an electrical impulse, and means for converting the electrical impulse into an audio alarm sound and/or visual alarm which repels an attacking predator.

6 Claims, 2 Drawing Sheets

SONIC COLLAR SHEEP PROTECTOR

BACKGROUND OF THE INVENTION

The invention relates to a sonic collar for placement about the neck region of livestock, such as sheep, to repel predators such as wolves, coyotes and dogs.

FIELD OF THE INVENTION

Numerous predator control methods have been placed in effect from time to time by ranchers, herders and governmental agencies in order to reduce or eliminate predator attacks. Among the various methods employed are traps, poison bait, and snares and shooting—to include shooting from helicopters and small aircraft.

These predator control techniques have not been selective in that they indiscriminately kill members of i.e. the coyote species responsible for sheep attacks as well as innocent coyote, and the indiscriminate slaughter from wildlife predator control programs is unacceptable. Moreover, these predator control programs are expensive and often times not cost effective in eliminating the predator responsible for attacks on sheep herds.

One object of the invention is to provide a combination audio and visual warning device to scare off a particular predator coyote without killing him, while simultaneously reducing the possibility of predator or coyote immunity.

Another object of the invention is to provide a cost effective device for scaring off a particular predator coyote without killing him, and without causing damage to sheep.

A yet further object of the invention is to provide an environmentally safe device for scaring off a particular predator, which is not harmful to the predator or other members of his species or wildlife.

Another object further still is to provide a device for scaring off predators to sheep, which is light-weight easy to handle and imposes no restrictions as to where or how far the sheep can roam, and is capable of scaring off the predator only when an attack is either imminent or underway.

SUMMARY OF THE INVENTION

The individual sheep unit U-shaped sonic collar sheep protector device of the present invention is a combination audio/visual warning device, which is activated by sudden or startled sheep movement which typically occurs when the sheep is frightened or attacked. The device contains a light sensor so that the unit is activated during the night. This feature helps to prevent false alarms during the day when the sheep are more active and the predators are relatively inactive. The built in light sensing circuit also helps to conserve battery power by shutting the unit down during the day when the risk of attacks are low.

In operation, a rancher fastens one of these U-shaped protector units around the neck of one out of every five sheep in a herd or flock, in a manner so that five or more different alarms are used in a herd. With five different alarms going off in a random order, and only during an imminent or present attack, experience has shown that the coyote or predator, is not rendered immune by a particular sound of the device.

In bright sunlight, the unit is inactive. Upon dusk or low illumination, the light sensor or meter activates the unit to a ready mode. In the ready mode, a sudden movement activates a preselected motion detector, and thereupon, the entire unit. Once activated, the unit is preselected to sound (which may include a resonant frequency of about 23 KHz to hurt the predator's ears) on alarm for about 10 seconds while simultaneously flashing a strobe light 2 to 4 times. Thereafter, the unit is preselected to shut-down (cessation of alarm sounds and strobe lights) for 10 minutes in order to allow the sheep sufficient time to settle down from the frenzied activity set-off by the attack.

DETAILED DESCRIPTION OF THE INVENTION

Figure 1:
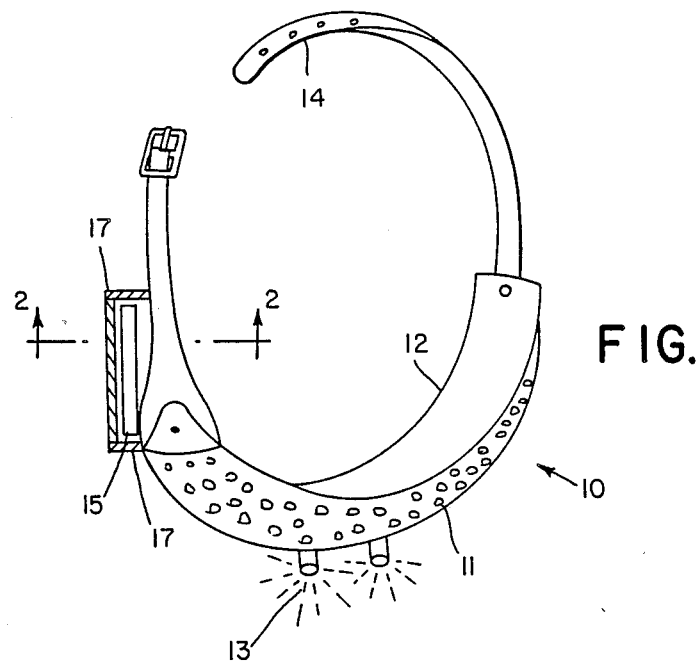
FIG. 1 is a frontal view of the sonic sheep protector.
Figure 2:
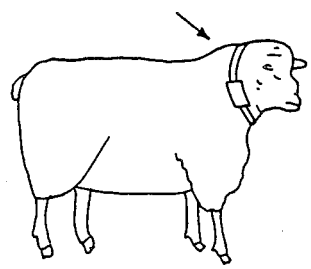
FIG. 2 is a view depicting the protector emplaced upon a sheep.
Figure 3:
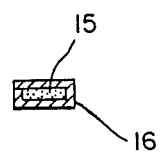
FIG. 3 is a cross-sectional view along line 2—2 showing the dry cell or battery enclosure section of the device.

FIG. 1 depicts the sonic collar sheep protector 10, having a bright colored (i.e. orange) collar section with audio openings 11, capable of emitting at least one of five different audio sounds from five different alarm patterns. The bright color of the collar serves as a marker and allows the herdsmen to reduce the cost of marker sheep (black sheep) needed in the flock.

The inner surface 12 of the collar or neck bend is flat and engages the area of the sheep's neck where a predator is likely to attack. One or more strobe lights 13 may be recessed, even with or protrude slightly from a visible section of the collar, which is sewn or otherwise attached to the collar, so as to allow the inclusion of a control circuit, strobe light circuit and audio alarm circuit.

The U-shaped device is placed about the sheep's neck and fastened by a nylon strap 14.

CONTROL CIRCUIT DESIGN

The unit is powered by a primary battery pack 6 to 12 volts (V) and a 3 volt flash battery pack. Diode D2 prevents reverse polarity damage. The light sensor section serves as the power switch for the control circuitry. This consists of a low power, high output, comparator IC (integrated circuit), Texas Instruments TLC3702. With this chip a reference voltage is applied to the plus input. A voltage divider circuit consisting of R4, R5 gives us a reference voltage of $$V_{ref} = (R5/(R4+R5)) * (V+ - 0.8)$$

$$V_{ref} = \tfrac{2}{3} * V+ - 0.7$$

Where 0.7 is the diode drop

When the voltage applied to the minus input is less then the reference at the plus input, the output is switched to ground. When the minus input voltage rises above the reference voltage (plus input), the output is switched to $V+ - 0.6$ volts. It is important to note here that the voltage at the minus input is also a voltage divider circuit consisting of R3, and a photo resistor in series with R2. R2 serves to increase the resistance from supply to ground in order to reduce the current draw. As the light changes so does the resistance of the photo resistor and therefore the voltage at the minus input. With the circuit as described, there would be an oscillation problem at the switching point since the light change is not a linear curve, therefore, R1 is added for hysteresis. When the switching occurs, the value of the reference now changes and this prevents switching back due to minor changes in light.

The shock sensor includes a piezo ceramic bender, such as part number DB-20PB by Project Unlimited or other suitable motion detectors, a ½" pvc pipe cap, a ⅜" stainless steel ball and resistors R7 and R8. When the ceramic resonator is struck by the ball it induces a voltage across R7 and R8. The ratio of these two resistors sets the sensitivity voltage. R6 is used for current limiting while DI protects the transistors from reverse voltage breakdown. Q1 will sort the shock sensor signal to ground during the 10 minute shut-down period. Q2 with R10 (pull-up resistor) form an inverter for the 10 second timer input. The two timers consist of a 7556 IC (a CMOS version of a dual 555 timer), R9 and C5 set the time constant for the 10 second timer, R17 and C4 set the time constant for the 10 minute timer, R19 and C9 set the time constant for the reset delay, this allows the circuitry to stabilize during turn-on at dusk before the timer is activated (i.e. prevents false turn on).

To operate the timer, Q2 (normally high) is pulled low by the signal from the shock sensor, this turns on the ten second timer (i.e. pin 5 goes high) which in turn turns on Q9 and Q3 which powers the alarm circuits. When Q9 turns on, it pulls pins 8 (10 minute timer input) low, and this turns on the 10 minute timer, which turns on Q1, thereby preventing another trigger for 10 minutes.

Resistors R11, R20, R22, R21, R16 are bias resistors for Q1, Q9, Q3 respectively. R18 is a pull-up resistor for Q9 and the 10 minute timer trigger. D3 prevents any current flow to the trigger during the shut-down period (day light). C14 helps to stabilize the power supply line during switching activity.

STROBE LIGHT CIRCUIT DESIGN

Figure 4:
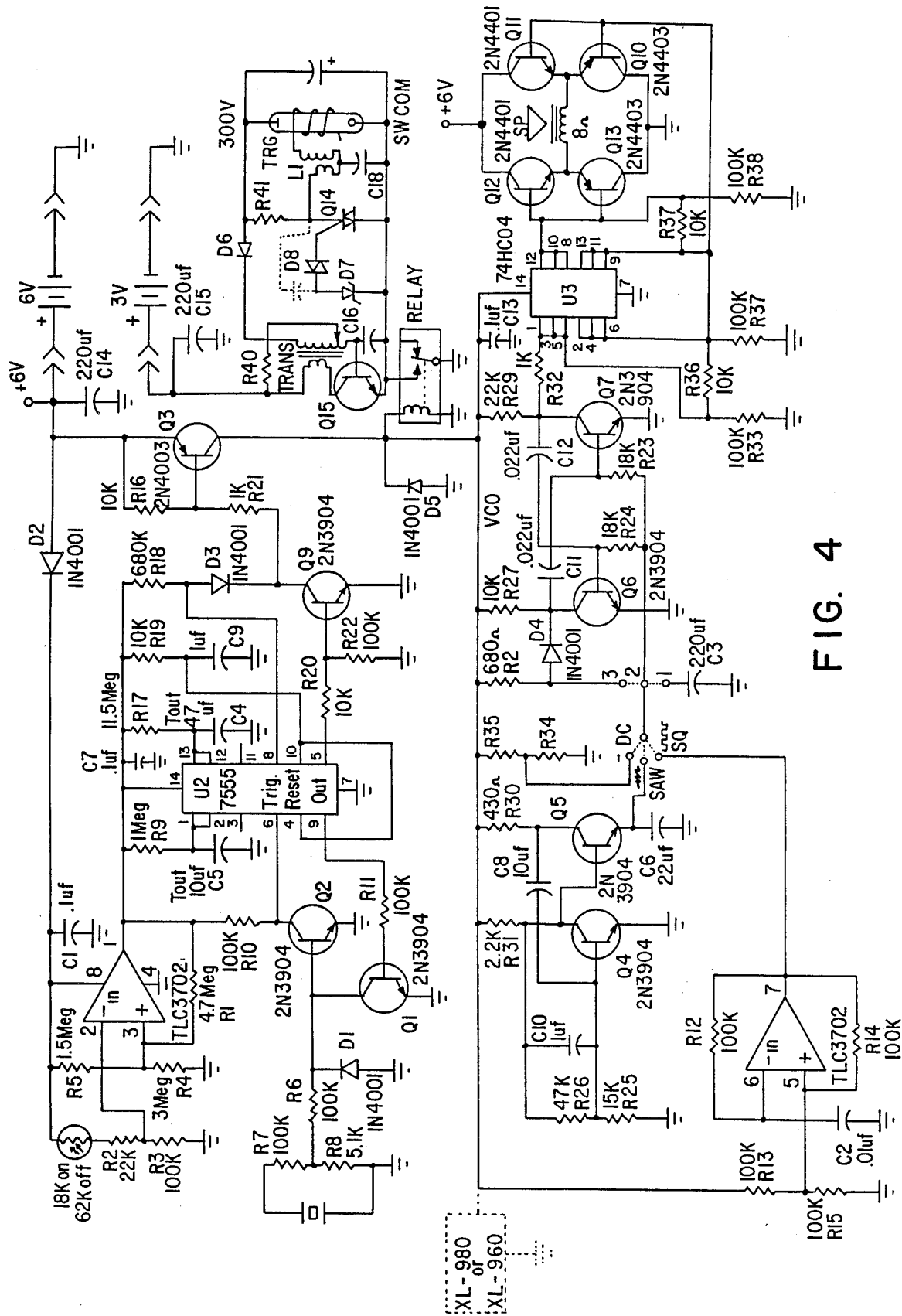
FIG. 4 is a schematic of the electric circuit of the collar.

The strobe circuit is switched by a relay since the high power draw (1 to 3 amps) drops excessive power across a transistor or FET. A 6 to 1400 turn ratio transformer is used in a switching power supply made up by Q15, C16, R40, D6, the transformer and a 330 volt, 120 uf electrolytic capacitor. This converts the 3 volt supply to 300 volts to drive the flash circuit. For a flash, C18 charges to 180 volts, though R41 (time delay) and the trigger coil (this limited current is not enough to trigger the flash). At 180 volts, Q14 the SIDAC or a triac Q14 (triggered by a diac D8 and a zenor diode D7 as shown in FIG. 4) turns on, this shorts the C18 charge through the trigger primary coil, yielding 1400 volts out of the secondary to trigger the exon bulb. Once triggered the flash bulb will discharge the supply capacitor down to approximately 15 volts, at which time the process repeats.

It is important to note here that the voltage converter is not perfect and cannot maintain a regulated 300 volts, and that the delay between flashes is do to the recovery time needed for the switching supply to bring the supply capacitor back up to about 200 volts needed to trigger the flash. The separate supply for the flash is due to the high power draw of the flash. If the flash pulls the batteries down too soon the rest of the unit including the audio alarm will still function.

AUDIO ALARM CIRCUIT

Multiple alarms can be configured by minor part changes here. The basic blocks here are a VCO (voltage controlled oscillator) consisting of Q6, Q7, R27, R29, R23, R24, R28, D4, C11, C12 where C11 and C12 allow easy modification of frequency range. R32 prevents excessive loading of the oscillator from the amp. For the amplifier, a standard inverter IC is used to drive a push-pull transistor amplifier. For the VCO input there is a saw tooth generator, consisting of Q4, Q5, R25, R26, R30, R31, C6, C8 and C10. R25 can be varied for frequency control. An alternative VCO input is a square waver generator consisting of U1, R12, R13, R14, R15 and C2. R12 and C2 set up the time constant to control the frequency. A voltage divider can also be used as the VCO input, yielding a single frequency output.

The PCB (printed circuit board) is laid out with jumpers to allow the various configurations. By inserting a jumper in the block marked "DC" the voltage divider input to the VCO will be used, similarly for "SAW" for the saw tooth generator, or "SQ" for the square wave generator. Also three different variations of the VCO are available, use jumper block labeled 1 2 3; no jumper yields one sound, a jumper across 1 and 2 yields another, and a jumper across 2 and 3 yields yet another. This last sound is similar to a wolf call and is never used at this time.

Another option, the audio circuits is to use a complete DC audio alarm tied between the collector of Q3 and ground. Two such alarms have been approved so far, they are a XL-980 or XL-960 by PROJECT UNLIMITED.

The components used in the sonic collar sheep protector have been chosen with consideration to low power and low cost while yielding high performance, and this is to be borne in mind if substituting parts. The RC time constant parts for the 7556 should be low leakage and tight tolerance since this is stretching the timing limits of this chip. The light sensor is set to turn the power on at a lower light level than where it turns the power off, and this spread in light level is adjustable by changing R1. The light trigger level is adjustable by changing the voltage divider to the minus input. The shock sensor sensitivity can be changed by adjusting the voltage divider consisting of R7 and R8. D5 is necessary to short the voltage kick back form the relay coil and C15 is a filter capacitor.

The battery(s) 15, are enclosed in a mold hard plastic case 16, that protrudes slightly outward from the collar in a manner so that it does not interfere with the sheep's comfort when the collar is around its neck. A contact plate 17, in each end of the case, and the plates are soldered to conductor wires while they frictionally engage the battery terminals so as to allow ease of battery replacement.

While the invention has been described with reference to a U-shaped design, it is important to note that many changes in the design configuration can be made without departing from the scope and spirit of the invention, which is defined by the appended claims.

What is claimed is:

1. A motion-sensing predator control sonic collar alarm unit adapted to be placed around the neck of livestock for repelling attacking predators, comprising:
   means for detecting startled or sudden bodily motion of said livestock in excess of a preselected threshold;

means for transforming said bodily motion into an electrical impulse; and means for converting said electrical impulse into an audio alarm sound which is detectable by and repulsive to a predator and for a period of time sufficient to repel an attack.

2. The control device of claim 1, wherein photoelectric means are included to keep said device inactivated throughout daylight periods when an attack is unlikely and activated from dusk to dawn when an attack is likely.

3. The control device of claim 1, further containing means for simultaneously converting some of the electrical impulses from said bodily motion into a flashing visual strobe light which is detectable by and repulsive to a predator and for a period of time sufficient to repel an attack.

4. The control device of claim 3, wherein the audio alarm sound is of at least 10 seconds duration and the flashing visual strobe light flashes from about 2 to about 4 times during said 10 second duration.

5. The control device of claim 4, further containing means for shutting down the unit for about 10 minutes after said 10 second period in order to allow the livestock to settle down.

6. The control device of claim 1, wherein the audio alarm sound is of a resonant frequency of about 23 KHz.

* * * * *